United States Patent
Chan et al.

(10) Patent No.: US 8,522,206 B2
(45) Date of Patent: Aug. 27, 2013

(54) SELECTIVE DELTA VALIDATION OF A SHARED ARTIFACT

(75) Inventors: Allen V. Chan, Markham (CA); Zhongming Chen, Scarborough (CA); Irum I. Godil, Toronto (CA); Kevin Quan, Toronto (CA)

(73) Assignee: International Business Machines Corporation, Armonk, NY (US)

( * ) Notice: Subject to any disclaimer, the term of this patent is extended or adjusted under 35 U.S.C. 154(b) by 627 days.

(21) Appl. No.: 12/732,502

(22) Filed: Mar. 26, 2010

(65) Prior Publication Data

US 2011/0107301 A1     May 5, 2011

(30) Foreign Application Priority Data

Oct. 30, 2009 (CA) ...................................... 2684225

(51) Int. Cl.
*G06F 9/44* (2006.01)
*G06F 9/45* (2006.01)

(52) U.S. Cl.
USPC ............ 717/121; 717/140; 717/164; 717/170

(58) Field of Classification Search
None
See application file for complete search history.

(56) References Cited

U.S. PATENT DOCUMENTS

| | | | |
|---|---|---|---|
| 6,532,588 B1 * | 3/2003 | Porter | 717/170 |
| 7,111,291 B2 * | 9/2006 | Loy et al. | 717/164 |
| 7,290,018 B2 | 10/2007 | Muecklich et al. | |
| 7,401,103 B2 | 7/2008 | Novik et al. | |
| 7,458,062 B2 * | 11/2008 | Coulthard et al. | 717/121 |
| 7,526,513 B2 | 4/2009 | Lees et al. | |
| 7,565,419 B1 | 7/2009 | Kwiatkowski et al. | |
| 7,752,603 B2 * | 7/2010 | Harutunian et al. | 717/121 |
| 7,844,957 B2 * | 11/2010 | Doucette et al. | 717/140 |
| 7,900,199 B2 * | 3/2011 | Gassoway | 717/164 |
| 7,941,786 B2 * | 5/2011 | Scott et al. | 717/121 |
| 8,060,867 B2 * | 11/2011 | Gassoway | 717/140 |
| 8,146,072 B2 * | 3/2012 | Trueba | 717/170 |

(Continued)

OTHER PUBLICATIONS

Rosina Weber, Representing and Retrieving Knowledge Artifacts, 2008, pp. 87-92.*

(Continued)

*Primary Examiner* — Thuy Dao
*Assistant Examiner* — Mongbao Nguyen
(74) *Attorney, Agent, or Firm* — Law Office of Jim Boice (57) ABSTRACT

An illustrative embodiment of a computer-implemented process for selective delta validation of a shared artifact receives a notification associated with a shared artifact, determines whether a unique key exists for the shared artifact in a symbol data structure, and responsive to a determination that the unique key exists, determines whether an update from an external source occurred. Responsive to a determination that the update occurred from an external source, receives a timestamp associated with the unique key from the symbol data structure to form a received timestamp, determines whether the received timestamp is prior to a last modification time, and responsive to a determination that the received timestamp is prior to the last modification time, performs a delta validation of the shared artifact.

20 Claims, 5 Drawing Sheets

(56) References Cited

U.S. PATENT DOCUMENTS

| | | |
|---|---|---|
| 2003/0078945 A1* | 4/2003 | Kibuse .......................... 707/200 |
| 2004/0111720 A1* | 6/2004 | Vertes .......................... 717/164 |
| 2005/0086641 A1* | 4/2005 | Hussey ......................... 717/121 |
| 2005/0257211 A1* | 11/2005 | Chatterjee et al. ............ 717/170 |
| 2006/0161516 A1* | 7/2006 | Clarke et al. ..................... 707/2 |
| 2006/0242632 A1* | 10/2006 | Orsolini et al. ............... 717/140 |
| 2007/0169103 A1* | 7/2007 | Bhatkhande et al. ......... 717/170 |
| 2008/0005114 A1* | 1/2008 | Li ..................................... 707/9 |
| 2009/0055809 A1 | 2/2009 | Campbell |
| 2009/0094572 A1* | 4/2009 | Hegde et al. .................. 717/101 |

OTHER PUBLICATIONS

Werner Geyer, Supporting Activity-centric Collaboration through Peer-to-Peer Shared Objects, 2003, pp. 1-7.*

Liviu Iftode, Improving Release-Consistent Shared Virtual Memory using Automatic Update, 1996, pp. 3-6.*

Ebner et al., "Collaborative Construction of Artifacts", Jan. 25, 2007, 9 pgs, School of Computer Science and Communication Royal Institute of Technology (KTH), Sweden.

\* cited by examiner

SELECTIVE DELTA VALIDATION OF A SHARED ARTIFACT

CROSS-REFERENCE TO RELATED APPLICATIONS

Pursuant to 35 U.S.C. 119, Applicant claims a right of priority to Canadian Patent Application No. 2684225 filed 30 Oct. 2009.

BACKGROUND

This disclosure relates generally to use of shared artifacts in a data processing system and, more specifically, to selective determination of delta validation of a shared artifact used in the data processing system.

In a non-trivial number of scenarios, a data processing system is built with multiple tools utilizing shared artifacts that do not explicitly support versioning. For example, one tool may be used to implement a Web service definition language (WSDL) service endpoint, and another independent tool may be used to invoke the Web service definition language service; however, both tools share a same Web service definition language artifact.

In certain instances, for example, during a development cycle, a tool may make changes to the artifact. These changes may need to be propagated to other tools that use the shared artifact. For example, the tool implementing a Web service definition language service endpoint may change the endpoint parameters, while other tools require the updated information for successful integration.

In some tools, properties from the shared artifacts may be stored in multiple places. The properties exist in the shared artifact, but may also be duplicated in local locations to provide functionality such as the ability to locally overwrite values. When these tools receive an updated shared artifact, there is a potential that a user may have made changes to the properties in these secondary locations. For example, a user may have overwritten the Web service definition language endpoint to temporarily integrate with a testing server. In another example, the Web service definition language endpoint is overwritten as a temporary workaround, and the shared artifact has now been updated with the correct value. In these examples, there is a discrepancy between the local value of the property and the same property value in the new shared artifact. For these discrepancies to be identified, the new shared artifact and dependencies must be entirely loaded, and compared against the local values. There may possibly be an unnecessary and potentially large performance impact due to loading and testing the artifact to identify which values take precedence. A user may be prompted to provide a precedence preference; however, this imposes a time cost and a requirement upon the user to make a general decision about each instance.

SUMMARY

According to one embodiment, a computer-implemented process for selective delta validation of a shared artifact receives a notification associated with a shared artifact, determines whether a unique key exists for the shared artifact in a symbol data structure, and responsive to a determination that the unique key exists, determines whether an update from an external source occurred. Responsive to a determination that the update occurred from an external source, receives a timestamp associated with the unique key from the symbol data structure to form a received timestamp, determines whether the received timestamp is prior to a last modification time of the shared artifact, and responsive to a determination that the received timestamp is prior to the last modification time, performs a delta validation of the shared artifact.

According to another embodiment, a computer program product for selective delta validation of a shared artifact is presented. The computer program product comprises a computer recordable medium containing computer executable program code stored thereon. The computer executable program code comprises computer executable program code for receiving a notification associated with a shared artifact, computer executable program code for determining whether a unique key exists for the shared artifact in a symbol data structure, computer executable program code responsive to a determination that the unique key exists, for determining whether an update from an external source occurred, computer executable program code responsive to a determination that the update occurred from an external source, for retrieving a timestamp associated with the unique key from the symbol data structure to form a received timestamp, computer executable program code for determining whether the received timestamp is prior to a last modification time of the shared artifact, and computer executable program code responsive to a determination that the received timestamp is prior to the last modification time, for performing a delta validation of the shared artifact.

According to another embodiment, an apparatus for selective delta validation of a shared artifact is presented. The apparatus comprises a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric, wherein the processor unit executes the computer executable program code to direct the apparatus to receive a notification associated with a shared artifact, determine whether a unique key exists for the shared artifact in a symbol data structure, responsive to a determination that the unique key exists, determine whether an update from an external source occurred, responsive to a determination that the update occurred from an external source, receive a timestamp associated with the unique key from the symbol data structure to form a received timestamp, determine whether the received timestamp is prior to a last modification time of the shared artifact, and responsive to a determination that the received timestamp is prior to the last modification time of the shared artifact, perform a delta validation of the shared artifact.

BRIEF DESCRIPTION OF THE SEVERAL VIEWS OF THE DRAWINGS

For a more complete understanding of this disclosure, reference is now made to the following brief description, taken in conjunction with the accompanying drawings and detailed description, wherein like reference numerals represent like parts.

DETAILED DESCRIPTION

Although an illustrative implementation of one or more embodiments is provided below, the disclosed systems and/or methods may be implemented using any number of techniques. This disclosure should in no way be limited to the illustrative implementations, drawings, and techniques illustrated below, including the exemplary designs and implementations illustrated and described herein, but may be modified within the scope of the appended claims along with their full scope of equivalents.

As will be appreciated by one skilled in the art, the present disclosure may be embodied as a system, method or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module," or "system." Furthermore, the present invention may take the form of a computer program product tangibly embodied in any medium of expression with computer usable program code embodied in the medium.

Any combination of one or more computer readable medium may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing. In the context of this document, .a computer readable storage medium may be any tangible medium that can contain, or store a program for use by or in connection with an instruction execution system, apparatus or device.

A computer readable signal medium may include a propagated data signal with computer readable program code embodied therein; for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus or device. Program code embodied in a computer readable signal medium may be transmitted using any appropriate medium, including but not limited to wireless, wire line, optical fiber cable, RF, etc., or any suitable combination of the foregoing.

Computer program code for carrying out operations of the present disclosure may be written in any combination of one or more programming languages, including an object oriented programming language such as Java™, Smalltalk, C++, or the like, and conventional procedural programming languages, such as the "C" programming language or similar programming languages. (Java and all Java-based trademarks and logos are trademarks of Sun Microsystems, Inc., in the United States, other countries or both.) The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus, systems, and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose. computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer or other programmable data processing apparatus to function in a particular manner, such that the instructions stored in the computer readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed in the computer or other programmable apparatus to produce a computer-implemented process such that the instructions that execute on the computer or other programmable apparatus provide processes for implementing the functions/acts specified in the flowchart and/or block diagram block or blocks.

Figure 1:
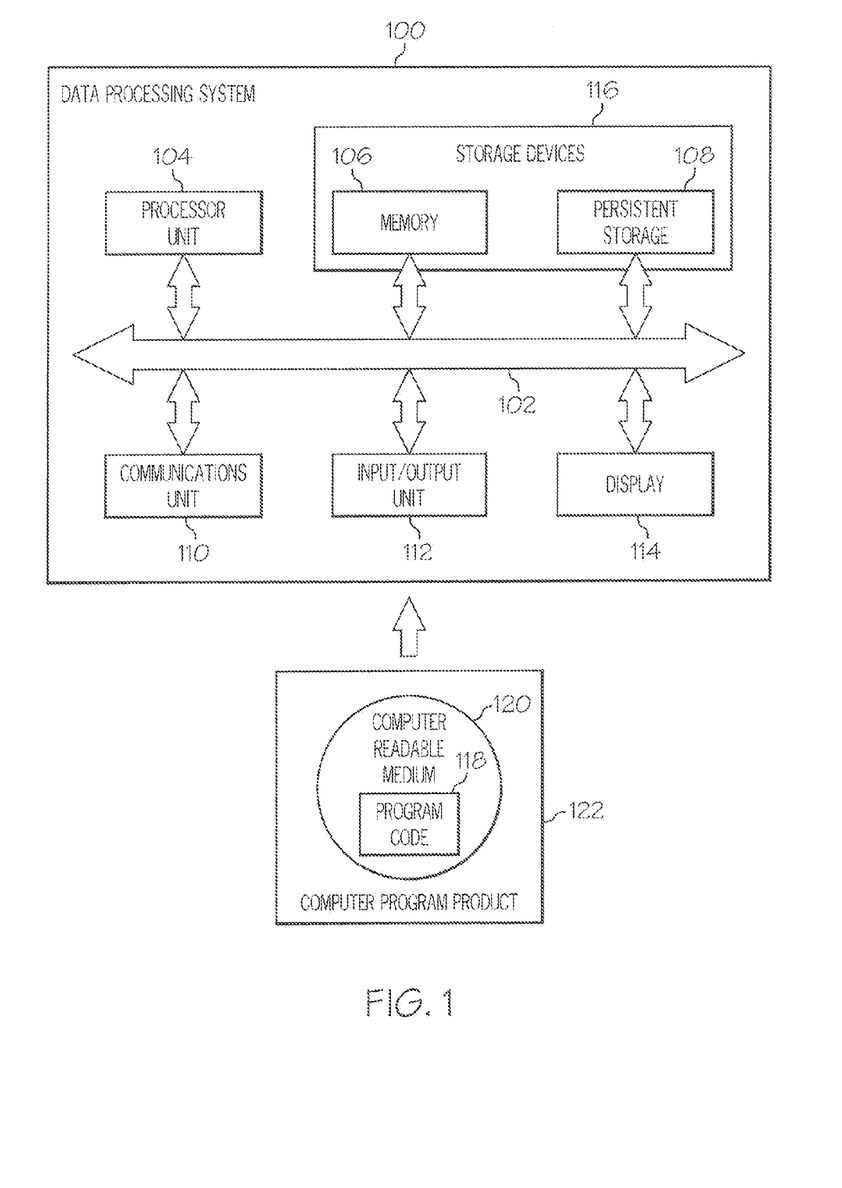
FIG. 1 is a block diagram of an exemplary data processing system operable for various embodiments of the disclosure.

Turning now to FIG. 1 a block diagram of an exemplary data processing system operable for various embodiments of the disclosure is presented. In this illustrative example, data processing system 100 includes communications fabric 102, which provides communications between processor unit 104, memory 106, persistent storage 108, communications unit 110; input/output (I/O) unit 112, and display 114.

Processor unit 104 serves to execute instructions for software that may be loaded into memory 106. Processor unit 104 may be a set of one or more processors or may be a multi-processor core, depending on the particular implementation. Further, processor unit 104 may be implemented using one or more heterogeneous processor systems in which a main processor is present with secondary processors on a single chip. As another illustrative example, processor unit 104 may be a symmetric multi-processor system containing multiple processors of the same type.

Memory 106 and persistent storage 108 are examples of storage devices 116. A storage device is any piece of hardware that is capable of storing information, such as, for example without limitation, data, program code in functional form, and/or other suitable information either on a temporary basis and/or a permanent basis. Memory 106, in these examples, may be, for example, a random access memory or any other suitable volatile or non-volatile storage device. Persistent storage 108 may take various forms depending on the particular implementation. For example, persistent storage 108 may contain one or more components or devices. For example, persistent storage 108 may be a hard drive, a flash memory, a rewritable optical disk, a rewritable magnetic tape, or some combination of the above. The medium used by persistent storage 108 also may be removable. For example, a removable hard drive may be used for persistent storage 108.

Communications unit 110, in these examples, provides for communications with other data processing systems or devices. In these examples, communications unit 110 is a network interface card. Communications unit 110 may provide communications through the use of either or both physical and wireless communications links.

Input/output unit 112 allows for input and output of data with other devices that may be connected to data processing system 100. For example, input/output unit 112 may provide a connection for user input through a keyboard, a mouse, and/or some other suitable input device. Further, input/output unit 112 may send output to a printer. Display 114 provides a mechanism to display information to a user.

Instructions for the operating system, applications and/or programs may be located in storage devices 116, which are in communication with processor unit 104 through communications fabric 102. In these illustrative examples the instructions are in a functional form on persistent storage 108. These instructions may be loaded into memory 106 for execution by processor unit 104. The processes of the different embodiments may be performed by processor unit 104 using computer-implemented instructions, which may be located in a memory, such as memory 106.

These instructions are referred to as program code, computer usable program code, or computer readable program code that may be read and executed by a processor in processor unit 104. The program code in the different embodiments may be embodied on different physical or tangible computer readable media, such as memory 106 or persistent storage 108.

Program code 118 may be located in a functional form on computer readable medium 120. Program code 118 and computer readable medium 120 form computer program product 122 in these examples. In one example, computer readable medium 120 may be in a tangible form, such as an optical or magnetic disc. The tangible form of computer readable medium 120 is also referred to as computer readable storage medium. In tangible form, the computer readable storage medium may take the form of a non-removable persistent storage, such as a hard drive, or a flash or other semiconductor memory that may be part of persistent storage 108. In other instances, the computer readable storage medium may be selectively removable and may be loaded onto or transferred to data processing system 100 for execution by processor unit 104 by inserting or placing it into a drive, a connector or other device that is part of persistent storage 108.

Alternatively, computer readable medium 120 may take the form of a propagated wave or data signal, which is referred to as computer readable signal medium. Examples of computer readable signal medium include radio waves, microwaves, infra-red waves, light waves and other forms of electro-magnetic signals or any combination of the foregoing. These electro-magnetic signals may be transmitted through various transmission media, such as through wires, cables and optical fibers, as well as wirelessly, and received by data processing system 100 through communications unit 110 or input/output unit 112. Program code 118 may be modulated on, or otherwise encoded or embedded in (with or without encryption) the computer readable signal medium to form computer program product 122.

In some illustrative embodiments, program code 118 may be downloaded over a network to persistent storage 108 from another device or data processing system for use within data processing system 100. For instance, program code stored in a computer readable storage medium in a server data processing system may be downloaded over a network from the server to data processing system 100. The data processing system providing program code 118 may be a server computer, a client computer, or some other device capable of storing and transmitting program code 118.

The different components illustrated for data processing system 100 are not meant to provide architectural limitations to the manner in which different embodiments may be implemented. The different illustrative embodiments may be implemented in a data processing system including components in addition to or in place of those illustrated for data processing system 100. Other components shown in FIG. 1 can be varied from the illustrative examples shown. The different embodiments may be implemented using any hardware device or system capable of executing program code. As one example, the data processing system may include organic components integrated with inorganic components and/or may be comprised entirely of organic components excluding a human being. For example, a storage device may be comprised of an organic semiconductor.

As another example, a storage device in data processing system 100 may be any hardware apparatus that may store data. Memory 106, persistent storage 108 and computer readable storage medium are examples of storage devices in a tangible form.

In another example, a bus system may be used to implement communications fabric 102 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 106 or a cache such as found in an interface and memory controller hub that may be present in communications fabric 102.

According to an illustrative embodiment, a computer-implemented process for selective delta validation of a shared artifact is presented. In one illustrative embodiment, a custom data structure, referred to as a symbol table, stores a time marker, a timestamp in some examples, indicating a time when an attribute of a shared artifact is changed in a secondary location. When the shared artifact is updated from an external, source, a comparison of the time marker and a last modification timestamp of the shared artifact is used to indicate whether a delta validation is required.

Using data processing system 100 of FIG. 1 as an example, an illustrative embodiment provides the computer-implemented process stored in memory 106, executed by processor unit 104, for selective delta validation of a shared artifact. Certain attributes of the artifact are stored within storage devices 116 including memory 106 and persistent storage 108 by an embodiment of a tool of the process on a system such as data processing system 100. When a shared artifact is first made available to the tool, the tool creates and stores an entry including a unique key identifying the shared artifact, and a last modification timestamp initialized to the current date and time pertaining to the shared artifact into a data structure maintained in storage devices 116.

When a property of the shared artifact is updated within the secondary location(s) available in the tool, the property's entry in the data structure is updated by setting the last modification timestamp to the current date and time. When a shared artifact is updated from an external source and identified, through a notification through communications unit 110, input/output unit 112 by the tool as possibly requiring validation, the last modified time of the updated shared artifact is received from storage devices 116. The received timestamp is compared with the entry for the shared artifact within the data structure by processor unit 104. When any timestamp in the data structure for properties pertaining to the shared artifact is older than the update timestamp of the shared artifact, delta validation is performed; otherwise delta validation is not performed.

In another example, a computer-implemented process, using program code 118 stored in memory 106 or as a computer program product 122, for selective delta validation of a shared artifact receives, through a communications unit 110, a notification associated with a shared artifact, determines whether a unique key exists for the shared artifact in a symbol data structure, stored within storage devices 116, and responsive to a determination by processor unit 104 that the unique key exists, determines whether an update from an external source occurred. Processor unit 104, responsive to a determination that the update occurred from an external source, receives a timestamp associated with unique keys from the symbol data structure to form several received timestamps, determines whether any of the received timestamps is prior to a last modification time, and responsive to a determination that the received timestamp is prior to the last modification time, performs a delta validation of the shared artifact.

In cases where the shared artifact has a set of properties which the user can edit, each property has a different unique key and associated timestamp. When any one property fails the test, then delta validation is performed. A set of properties is one or more properties.

In an alternative embodiment, program code 118 containing the computer-implemented process may be stored within computer readable media 120 as computer program product 122. In another illustrative embodiment, the process for selective determination of delta validation of a shared artifact may be implemented in an apparatus comprising a communications fabric, a memory connected to the communications fabric, wherein the memory contains computer executable program code, a communications unit connected to the communications fabric, an input/output unit connected to the communications fabric, a display connected to the communications fabric, and a processor unit connected to the communications fabric. The processor unit of the apparatus executes the computer executable program code to direct the apparatus to perform the process.

Figure 2:
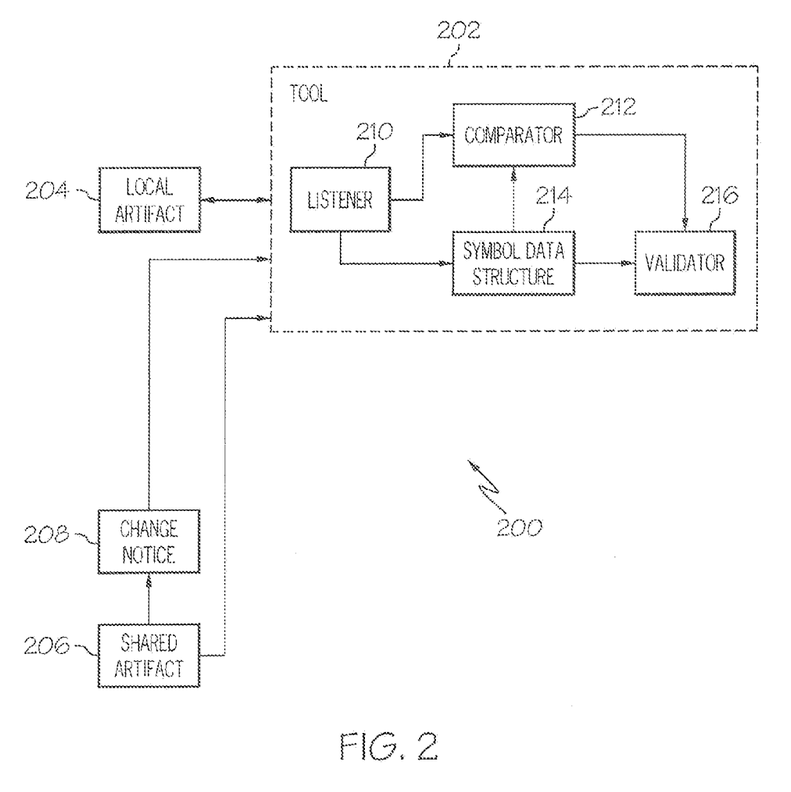
FIG. 2 is a block diagram of a validation system, in accordance with various embodiments of the disclosure.

With reference to FIG. 2, a validation system, in accordance with various embodiments of the disclosure is presented. Validation system 200 is an example of a system using data processing 100 of FIG. 1. In one illustrative embodiment, validation system 200 comprises a number of cooperative components including tool 202, local artifact 204, shared artifact 206, change notice 208, listener 210, comparator 212, symbol data structure 214 and validator 216.

Tool 202 provides a capability to determine whether a validation is required based on information for a local artifact and information for a shared artifact. Local artifact 204 is related to shared artifact 206 in a child-parent relationship. Local artifact 204 is a child, local copy or variant of shared artifact 206. When a change is made in shared artifact 206 notification of the change is sent to subscribers wherein a subscriber maintains a local artifact version of the shared artifact. The notification is sent to subscribers in the form of change notice 208. A subscriber, implementing tool 202 receives the notification via listener 210 of tool 202.

Comparator 212 of tool 202 uses information in change notice 208 to compare with stored information for the artifact in symbol data structure 214. Symbol data structure 214 contains a set of entries for each shared artifact 206. A set of entries comprises a number of elements including a unique identifier for the shared artifact itself and a unique identifier for each property entry within the shared artifact. Based on a comparison of the information in the notification and the stored information a determination is made as to whether to validate the shared artifact using validator 216. Validator 216, responsive to a determination that the received timestamp from the symbol data structure is prior to the last modification time, performs a delta validation of the shared artifact. Validation is only performed when necessary to avoid time delay and processor overhead.

Figure 3:
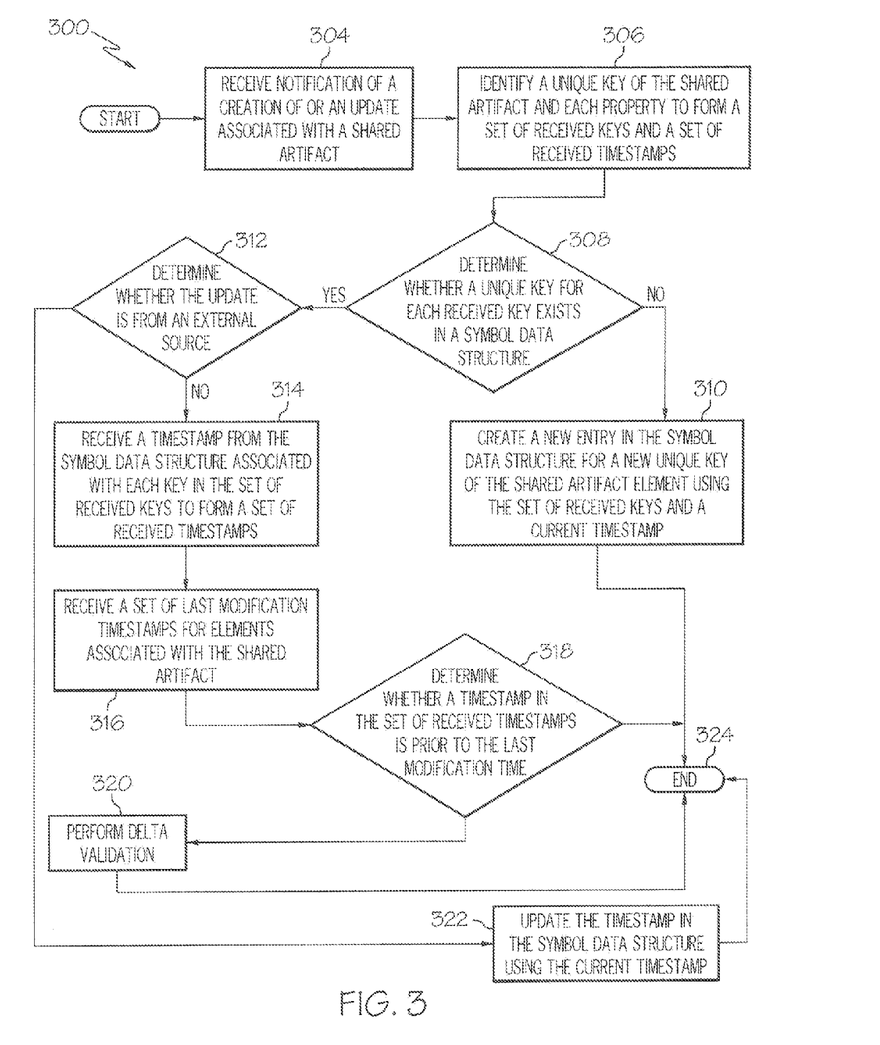
FIG. 3 is a flowchart of a validation determination process, in accordance with one embodiment of the disclosure.

With reference to FIG. 3, a flowchart of a validation determination process, in accordance with one embodiment of the disclosure is presented. Validation determination process 300 is an example of a process using tool 202 of validation system 200 of FIG. 2.

Process 300 starts (step 302) and receives notification of a creation or of an update associated with a shared artifact (step 304). From the information received, identify a unique key of the shared artifact and each property of the shared artifact to form a set of received keys and a set of received timestamps is performed (step 306). To minimize network traffic, a change notification may use a compact form to provide information related to elements of the unique identifier of the parent shared artifact and, a unique identifier of each changed property within the shared artifact and associated timestamps. Typical attributes include a unique key identifying the shared artifact, and a last modification timestamp initialized to the current date and time. Other attributes when present provide a set of property identifiers and property specific timestamps associated with the shared artifact. Process 300 determines whether a unique key, for each received key, of an element of the shared artifact, exists in a symbol data structure (step 308).

When a determination is made that a unique key exists in a symbol data structure, a "yes" result is obtained. When a determination is, made that a unique key does not exist in a symbol data structure, a "no" result is obtained. When a "no" result is obtained in step 308, process 300 creates and stores a new entry into the symbol data structure, for the new unique key of the shared artifact or property using the set of received keys and a current timestamp (step 310). The entry for the new element is stored in a symbol data structure such as symbol data structure 214 of FIG. 2, pertaining to the shared artifact or the individual property element. Process 300 terminates thereafter (step 324).

When a "yes" is obtained in step 308, process 300 determines whether the update is from an external source (step 312). When a determination is made that the update is from an external source, a "yes" is obtained. When a determination is made that the update is not from an external source, a "no" is obtained. When a "yes" is obtained in step 312, process 300 receives a timestamp from the symbol data structure associated with each unique key in the set of received keys of the shared artifact and other property identifiers to form a set of received timestamps (step 314).

When a shared artifact is updated from an external source and identified by the tool as possibly requiring validation, process 300 receives a set of last modified timestamps for elements associated with the updated shared artifact (step 316). The last modified timestamps may differ for each element of the shared artifact or be the same as the timestamp of the shared artifact. The last modified timestamp for the shared artifact is compared with the timestamp entry for the shared artifact within the symbol data structure. Process 300 determines whether any of the received timestamps from the symbol data structure is older than a corresponding timestamp of the set of last modified timestamps of the updated shared artifact (step 318).

When a "no" result is obtained in step 312, process 300 updates the timestamp in the symbol data structure using the current timestamp (step 322). Process 300 ends (step 324). When a user overwrites a shared artifact property value in a secondary location for the first time, the new value takes precedence since the property value was just edited. There is no need to validate the difference between the shared artifact and the new value. When a property of the shared artifact is updated within a secondary location available in the tool, the respective entry in the symbol data structure for the artifact is updated by setting the last modification timestamp to the current date and time.

When a determination is made that a received timestamp from the symbol data structure is before a corresponding timestamp of the updated shared artifact, a "yes" result is obtained. When a determination is made that a received timestamp from the symbol data structure is not before a corresponding timestamp of the updated shared artifact, a "no" result is obtained. When a "no" result is obtained in step 318, process 300 terminates (step 324). When a "yes" is obtained, process 300 performs delta validation (step 320). The delta validation is performed on the shared artifact; otherwise delta validation will not be performed. The comparison of timestamps acts as a proxy to versioning, signaling whether a user has manually modified attributes of the shared artifact since the last external update. In the examples just described, a timestamp for the shared artifact is one of a set of timestamps associated with property entries of the shared artifact as well as an entry for the shared artifact.

Process 300 does not describe a solution to identify which instance of the shared artifact's attribute value should take precedence. A determination with respect to precedence of attribute values is left to the tool, whether through the delta validation or some other means, to determine which instance should be the correct shared artifact's attribute value in the tool. In instances where there are multiple secondary locations within the tool for a property, it is typically expected that the tool will ensure these instances are synchronized.

When there is a requirement for multiple distinct instances, each distinct instance will require a separate entry in the symbol data structure. The time stamp in the symbol data structure is not updated when a decision regarding delta validation is performed. In an alternative embodiment, when a determination is based on an individual property basis, a property or element of interest may be indicated for comparison. For example, when a shared artifact contains a set of properties a user may identify specific properties within the set as properties of interest and ignore the remaining properties. Property identifiers in a received notification of an update for the shared property are compared with the identified properties of interest. When a match is determined in process 300, a determination as to whether a delta validation is required is performed. When no match occurs, the updated properties are deemed to not be of interest, or impact, and therefore process 300 need not determine whether to perform a delta validation. The alternative just described provides for further granularity in specifically processing an element timestamp of the shared artifact or a property thereof rather than a previous embodiment identifying any received timestamp prior to a last modification timestamp.

Figure 4:
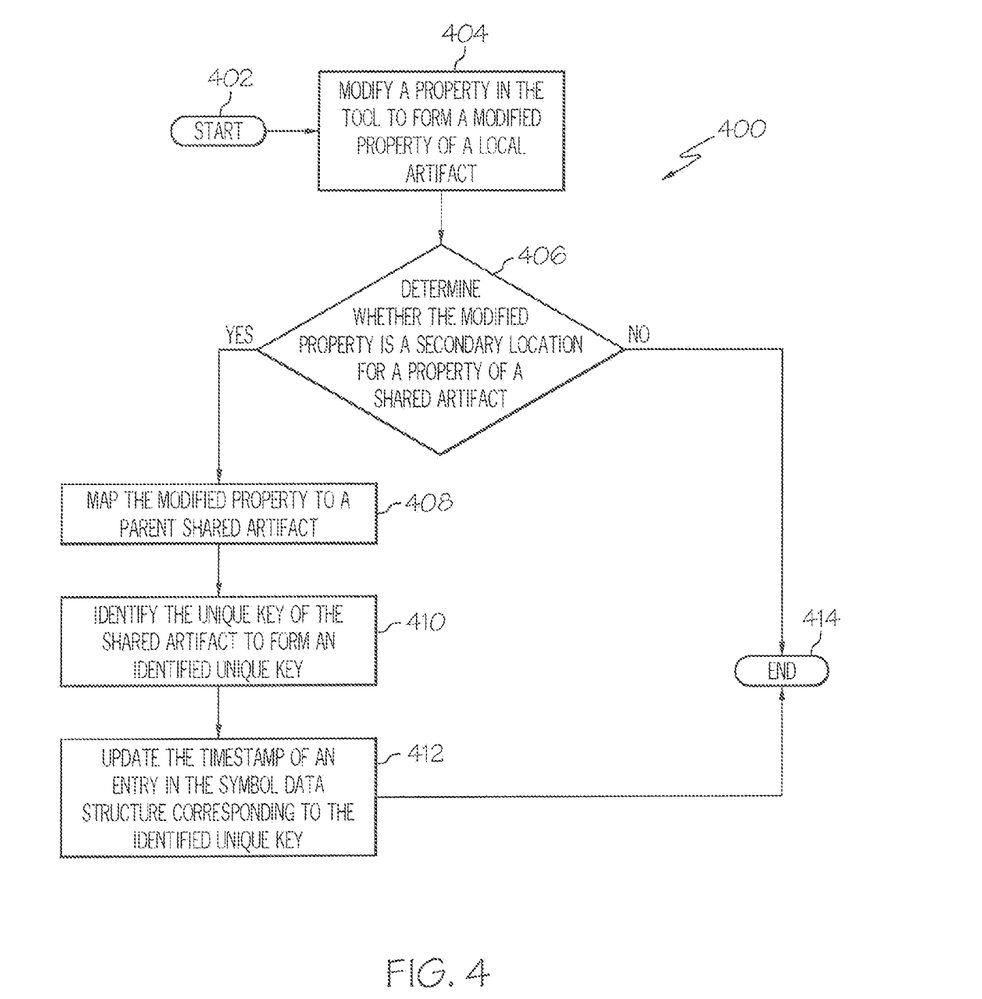
FIG. 4 is a flowchart of a property modification process used within the validation determination process of FIG. 3, in accordance with one embodiment of the disclosure.

With reference to FIG. 4, a flowchart of a property modification process used within the validation determination process of FIG. 3, in accordance with one embodiment of the disclosure is presented. Process 400 is an example of a process of updating attributes of a local artifact when using process 300 of FIG. 3.

Process 400 starts (step 402) and performs modify a property in the tool to form a modified property of a local artifact (step 404). Process 400 determines whether the modified property is a secondary location for a property of a shared artifact (step 406). When a determination is made that the modified property is a secondary location for a property of a shared artifact, a "yes" result is obtained. When a determination is made that the modified property is not a secondary location for a property of a shared artifact, a "no" result is obtained.

When a "no" result is obtained in step 406, process 400 ends (step 414). When a "yes" is obtained in step 406, process 400 maps the modified property to a parent shared artifact (step 408). The modified property of the local artifact is matched with a corresponding property of a parent shared artifact. Matching of the properties also enables process 400 to identify a unique key of the property of the shared artifact to form an identified unique key (step 410). Having thus identified the unique key, process 400 updates the timestamp of an entry in the symbol data structure corresponding to the identified unique key (step 412) with process 400 ending thereafter (step 414) as before.

For example, an attribute has an initial value a in a physical shared artifact. The attribute value is then overwritten by a local user at instant $t_1$ to become the value b. Thus, the property entry in the symbol data structure has a last modification timestamp of a time $t_1$.

Now at instant $t_2$ and instant $t_3$, where $t_3 > t_2 > t_1$, the attribute of the shared artifact is further updated to a value c and then a value d respectively. Assume the final change to value d arrives first. Due to $t_3 > t_1$, delta validation is performed. Now, suppose the delayed change from $t_2$ arrives, should delta validation occur? If the timestamp of the attribute in the symbol data structure is automatically updated because the change value d arrived, then no delta validation would occur. The assumption is incorrect because the user may not have updated the value of the attribute at the secondary location to d, and in fact would need to validate the new value c against the existing value b. Updating the time stamp in the symbol data structure when the user modifies the attributes of the secondary location ensures the process just described will perform the correct delta validation as needed.

Figure 5:
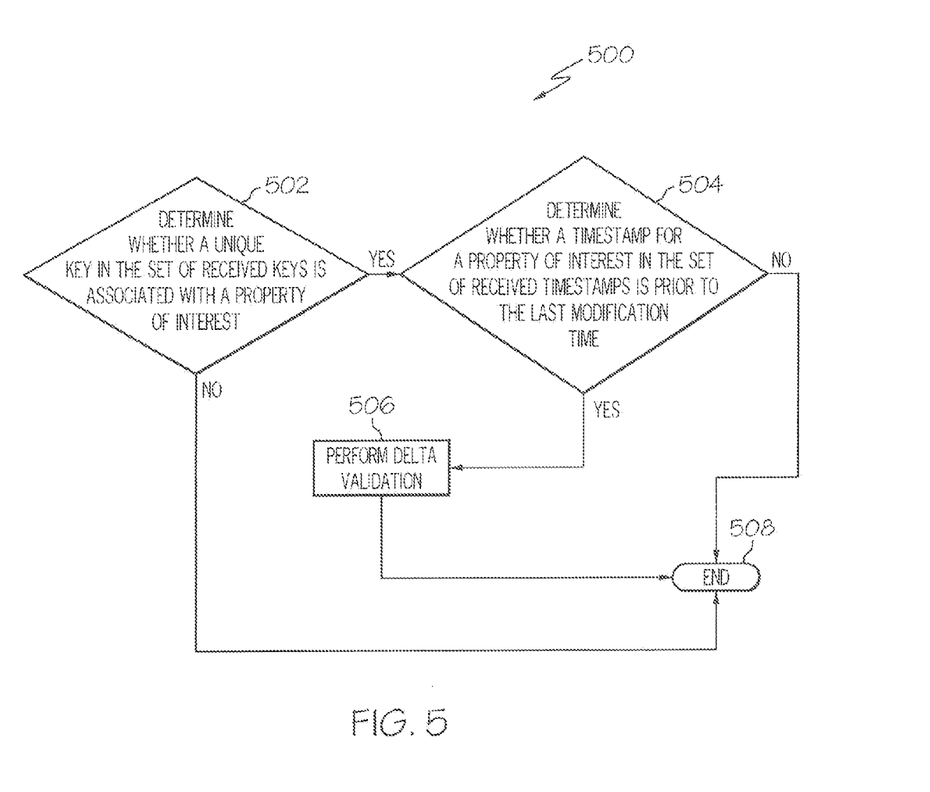
FIG. 5 is a flowchart of a validation determination process for a property of interest, in accordance with one embodiment of the disclosure.

With reference to FIG. 5, a flowchart of a validation determination process for a property of interest, in accordance with one embodiment of the disclosure is presented. Process 500 is an example of process 300 of FIG. 3 extended to increase granularity to individual attributes of a shared artifact rather than the entire shared artifact of the examples. Comparing timestamps of a property of a shared artifact provides a processing capability of increased granularity. Individual property based comparisons enable elements or properties of interest to be tracked rather than being constrained to a larger scope of the complete shared artifact. For example, when property A is tracked and property B causes a change, a granular test may not trigger delta validation because property B is of no interest. However, there is still a benefit to storing the enclosing shared artifact because it enables the identification of instances where loading the entire shared artifact is unnecessary.

Using the example of process 300 of FIG. 3, process 500, in one embodiment, may replace step 318. Process 500 determines whether a unique key in the set of received keys is associated with a property of interest (step 502). A property of interest is a property of a shared artifact that is important to a requester. For example the property of interest, when changed in the shared artifact will impact the local version of the shared artifact. Therefore knowledge of a change in such property will be of interest to a local tool user or local artifact user.

When a determination is made that a unique key in the set of received keys is associated with a property of interest, a "yes" result is obtained. When a determination is made that a unique key in the set of received keys is not associated with a property of interest, a "no" result is obtained. When a "yes" result is obtained in step 502 process 500 determines whether timestamp for a property of interest in the set of received timestamps is prior to the last modification time (step 504). Step 504 is similar to step 318 of process 300 of FIG. 3, however in this case the determination is made only for a property of interest. When a "no" result is obtained in step 502, process 500 ends (step 508).

When a determination is made that a timestamp for a property of interest in the set of received timestamps is prior to the last modification time, a "yes" result is obtained. When a determination is made that a timestamp for a property of interest in the set of received timestamps is not prior to the last modification time, a "no" result is obtained. When a "yes" is obtained in step 504, process 500 performs delta validation (step 506) with process 500 terminating thereafter (step 508). Delta validation is performed as in process 300 of FIG. 3. When a "no" is received in step 504, process 500 ends (step 508).

Thus illustrative embodiments provide a process for selective determination of delta validation of a shared artifact used in the data processing system has been presented. By only updating the time stamp in the symbol data structure when the user modifies the attributes of the secondary location, the process just described ensures a correct delta validation decision. The timestamp in the entry for the artifact in the symbol data structure acts as a proxy to versioning, signaling whether a user has manually modified attributes of the shared artifact since the last external update.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing a specified logical function. It should also be noted that, in some alternative implementations, the functions noted in the block might occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, and other software media that may be recognized by one skilled in the art.

It is important to note that while the present invention has been described in the context of a fully functioning data processing system, those of ordinary skill in the art will appreciate that the processes of the present invention are capable of being distributed in the form of a computer readable medium of instructions and a variety of forms, and that the present invention applies equally regardless of the particular type of media actually used to carry out the distribution. Examples of computer readable media include recordable-type media, such as a floppy disk, a hard disk drive, a RAM, a CD-ROM, a DVD-ROM, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems, and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A computer-implemented process for selective delta validation of a shared artifact, the computer-implemented process comprising:
- receiving at a data processing subscriber system a notification associated with the shared artifact;
- determining whether a set of unique keys exists for the shared artifact in a symbol data structure, wherein the symbol data structure identifies a property of interest of an update receiver, and wherein the property of interest is a property of the shared artifact that has been predetermined to he important to the update receiver;
- responsive to a determination that the set of unique keys exists in the symbol data structure, determining whether a first update from an external data processing source occurred;
- responsive to a determination that the first update occurred from the external data processing source, retrieving a set of symbol data timestamps associated with the set of unique keys from the symbol data structure;
- determining whether a first timestamp in the set of symbol data timestamps is prior to a corresponding last modification timestamp associated with the shared artifact;
- determining whether the first update is related to the property of interest of the update receiver; and
- responsive to a determination that the first timestamp in the set of symbol data timestamps is prior to the corresponding last modification timestamp, and in response to determining that the first update is related to the property of interest of the update receiver, performing a delta validation of the shared artifact.

2. The computer-implemented process of claim 1, further comprising:
- installing the first update into the shared artifact;
- receiving a second update to the shared artifact, wherein the second update is received after the first update, and wherein the second update is timestamped prior to the first update;
- uninstalling the first update from the shared artifact;
- installing the second update into the shared artifact; and
- subsequently reinstalling the first update into the shared artifact after the second update is installed into the shared artifact.

3. The computer-implemented process of claim 1, further comprising: responsive to a determination that the first update did not occur from the external data processing source, updating a second timestamp in the set of symbol data timestamps, the second timestamp being associated with an element of the shared artifact.

4. The computer-implemented process of claim 1, further comprising: responsive to a determination that a first key of the set of unique keys does not exist in the symbol data structure, creating a new entry in the symbol data structure using the first key and a current timestamp.

5. The computer-implemented process of claim 1 where, responsive to a determination that the first update from the external data processing source did not occur, the computer-implemented process further comprising:
- modifying a property in a tool to form a modified property; and
- determining whether the modified property is a secondary location for a property of the shared artifact.

6. The computer-implemented process of claim 5 where, responsive to a determination that the modified property is the secondary location for the property of the shared artifact, the computer-implemented process further comprising:
- mapping the modified property to a parent shared artifact;
- identifying a unique key of the modified property in the parent shared artifact to form an identified unique key; and
- updating a timestamp of an entry in the symbol data structure corresponding to the identified unique key with a current timestamp.

7. The computer-implemented process of claim 1, where the step of determining whether a first timestamp in the set of symbol data timestamps is prior to a corresponding last modification timestamp further comprises receiving a last modification time for a physical file of the shared artifact.

8. A computer program product comprising a computer readable storage memory having computer readable program code embodied therewith, where the computer readable program code when executed on a computer causes the computer to:
- receive a notification associated with a shared artifact;
- determine whether a set of unique keys exists for the shared artifact in a symbol data structure, wherein the symbol data structure identifies a property of interest of an update receiver, and wherein the property of interest is a property of the shared artifact that has been predetermined to be important to the updated receiver;
- responsive to a determination that the set of unique keys exists for the shared artifact in the symbol data structure, determine whether a first update from an external source occurred;
- responsive to a determination that the first update from the external data processing source occurred, retrieve a set of symbol data timestamps associated with the set of unique keys from the symbol data structure;
- determine whether a first timestamp in the set of symbol data timestamps is prior to a corresponding last modification timestamp associated with the shared artifact;
- determine whether the first update is related to the property of interest of the update receiver; and
- responsive to a determination that the first timestamp in the set of symbol data timestamps is prior to the corresponding last modification timestamp, and in response to a determination that the first update is related to the property of interest of the update receiver, perform a delta validation of the shared artifact.

9. The computer program product of claim 8, where the computer readable program code when executed on the computer further causes the computer to:
- install the first update into the shared artifact;
- receive a second update to the shared artifact, wherein the second update is received after the first update, and wherein the second update is timestamped prior to the first update;
- uninstall the update from the shared artifact;
- install the second update into the shared artifact; and
- subsequently reinstall the first update into the shared artifact after the second update is installed into the shared artifact.

10. The computer program product of claim 8, where the computer readable program code when executed on the computer further causes the computer to:
- responsive to a determination that the first update did not occur from the external source, update a second timestamp in the set of symbol data timestamps, the second timestamp being associated with an element of the shared artifact.

11. The computer program product of claim 8, where the computer readable program code when executed on the computer further causes the computer to:
   responsive to a determination that a first key of the set of unique keys does not exist in the symbol data structure, create a new entry in the symbol data structure using the first key and a current timestamp.

12. The computer program product of claim 8, where the computer readable program code when executed on the computer further causes the computer to:
   modify a property in a tool to form a modified property; and
   determine whether the modified property is a secondary location for a property of the shared artifact.

13. The computer program product of claim 12, where the computer readable program code when executed on the computer further causes the computer to:
   map the modified property to a parent shared artifact;
   identify a unique key of the modified property in the parent shared artifact to form an identified unique key; and
   update a timestamp of an entry in the symbol data structure corresponding to the identified unique key with a current timestamp.

14. The computer program product of claim 8, where the computer readable program code when executed on the computer further causes the computer to receive a last modification time for a physical file of the shared artifact.

15. An apparatus, comprising:
   a storage device comprising computer executable program code;
   a processor coupled to the storage device, where the processor executes the computer executable program code to direct the apparatus to:
      receive a notification associated with a shared artifact;
      determine whether a set of unique keys exists for the shared artifact in a symbol data structure, wherein the symbol data structure identifies a property of interest of an update receiver, and wherein the property of interest is a p property of the shared artifact that has been predetermined to be important to the update receiver;
      responsive to a determination that the set of unique keys exists for the shared artifact in the symbol data structure, determine whether a first update from an external source occurred;
      responsive to a determination that the first update from the external data processing source occurred, retrieve a set of symbol data timestamps associated with the set of unique keys from the symbol data structure;
      determine whether a first timestamp in the set of symbol data timestamps is prior to a corresponding last modification timestamp associated with the shared artifact;
      determine whether the first update is related to the property of interest of the update receiver; and
      responsive to a determination that the first timestamp in the set of symbol data timestamps is prior to the corresponding last modification timestamp, and in response to a determination that the first update is related to the property of interest of the update receiver, perform a delta validation of the shared artifact.

16. The apparatus of claim 15, wherein the processor further executes the computer executable program code to direct the apparatus to:
   install the first update into the shared artifact;
   receive a second update to the shared artifact, wherein the second update is received after the first update, and wherein the second update is timestamped prior to the first update;
   uninstall the first update from the shared artifact;
   install the second update into the shared artifact; and
   subsequently reinstall the first update into the shared artifact after the second update is installed, into the shared artifact.

17. The apparatus of claim 15, where the processor further executes the computer executable program code to direct the apparatus to:
   responsive to a determination that the first update did not occur from the external data processing source, update a second timestamp in the set of symbol data timestamps, the second timestamp being associated with an element of the shared artifact.

18. The apparatus of claim 15, where the processor further executes the computer executable program code to direct the apparatus to:
   responsive to a determination that a first key of the set of unique keys does not exist in the symbol data structure, create a new entry in the symbol data structure using the first key and a current timestamp.

19. The apparatus of claim 15, where the processor further executes the computer executable program code to direct the apparatus to:
   modify a property in a tool to form a modified property; and
   determine whether the modified property is a secondary location for a property of the shared artifact.

20. The apparatus of claim 19, wherein the processor further executes the computer executable program code to direct the apparatus to:
   map the modified property to a parent shared artifact;
   identify a unique key of the modified property in the parent shared artifact to form an identified unique key; and
   update a timestamp of an entry in the symbol data structure corresponding to the identified unique key with a current timestamp.

* * * * *